US012753258B2

(12) United States Patent
Shibuya

(10) Patent No.: US 12,753,258 B2
(45) Date of Patent: Oct. 6, 2026

(54) ACRYLIC RUBBER, RUBBER COMPOSITION AND RUBBER CROSSLINKED PRODUCT

(71) Applicant: ZEON CORPORATION, Tokyo (JP)

(72) Inventor: Masanori Shibuya, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 506 days.

(21) Appl. No.: 18/283,107

(22) PCT Filed: Mar. 11, 2022

(86) PCT No.: PCT/JP2022/010946

§ 371 (c)(1),
(2) Date: Sep. 20, 2023

(87) PCT Pub. No.: WO2022/202406

PCT Pub. Date: Sep. 29, 2022

(65) Prior Publication Data

US 2024/0301107 A1 Sep. 12, 2024

(30) Foreign Application Priority Data

Mar. 23, 2021 (JP) ................................. 2021-048378

(51) Int. Cl.

*C08F 220/56* (2006.01)
*C08F 2/22* (2006.01)
*C08F 220/18* (2006.01)
*C08F 222/14* (2006.01)

(52) U.S. Cl.

CPC .............. *C08F 220/56* (2013.01); *C08F 2/22* (2013.01); *C08F 220/1802* (2020.02); *C08F 220/1804* (2020.02); *C08F 222/14* (2013.01)

(58) Field of Classification Search

CPC .............. C08F 220/56; C08F 220/1804; C08F 220/1802; C08F 222/14; C08F 222/325; C08F 222/64; C08F 222/02; C08F 222/06; C08F 222/1402

See application file for complete search history.

(56) References Cited

U.S. PATENT DOCUMENTS

2017/0247581 A1 8/2017 Zhang et al.

FOREIGN PATENT DOCUMENTS

| | | | |
|---|---|---|---|
| CN | 103910826 | A | 7/2014 |
| CN | 107502246 | A | 12/2017 |
| JP | H07-145291 | A | 6/1995 |
| JP | H11-199825 | A | 7/1999 |
| JP | 2005-116610 | A | 4/2005 |
| JP | 2017-532432 | A | 11/2017 |

OTHER PUBLICATIONS

Feb. 24, 2025 extended Search Report issued in European Patent Application No. 22775198.9.
Sep. 12, 2023 International Preliminary Report on Patentability issued in International Patent Application No. PCT/JP2022/010946.
May 31, 2022 International Search Report issued in International Patent Application No. PCT/JP2022/010946.

*Primary Examiner* — Mark S Kaucher
(74) *Attorney, Agent, or Firm* — Oliff PLC

(57) ABSTRACT

An acrylic rubber having at least one cross-linkable group-containing monomer unit selected from the group including carboxyl group-containing monomer units, halogen atom-containing monomer units, and epoxy group-containing monomer units, and an (meth)acrylamide monomer units, wherein the amount of the (meth)acrylamide monomer unit is 0.2 to 17.5% by weight of the total monomer units.

5 Claims, No Drawings

ACRYLIC RUBBER, RUBBER COMPOSITION AND RUBBER CROSSLINKED PRODUCT

TECHNICAL FIELD

The present invention relates to an acrylic rubber, a rubber composition, and a cross-linked rubber, and more specifically relates to an acrylic rubber which has high processability and is capable of providing a cross-linked rubber having high elongation at break and high tensile strength, and a rubber composition and a cross-linked rubber obtained using such an acrylic rubber.

BACKGROUND ART

Acrylic rubber, which is a group of polymers comprising units derived from an (meth)acrylic acid ester monomer such as an alkyl (meth)acrylate ester monomer or an alkoxyalkyl (meth)acrylate ester monomer as a main component, is generally known as a type of rubber having high heat resistance, oil resistance, and ozone resistance, and is widely used in automobile-related fields.

Such acrylic rubber is typically produced by emulsion polymerizing monomer components (mainly an (meth) acrylic acid ester monomer such as an alkyl (meth)acrylate ester monomer or an alkoxyalkyl (meth)acrylate ester monomer), and adding a coagulant to the resulting polymer emulsion to cause coagulation, followed by drying hydrous crumbs obtained by the coagulation (see Patent Document 1, for example).

RELATED ART DOCUMENTS

Patent Document

Patent Document 1: JPH7-145291 A

SUMMARY OF THE INVENTION

Problem to be Solved by the Invention

Unfortunately, conventional acrylic rubbers including one according to Patent Document 1, when mixed with a variety of compounding agents using a roll, tend to adhere to the roll, which suggests that their processability during processing using a roll is unsatisfactory.

The present invention has been made in consideration of such circumstance. An objective of the present invention is to provide an acrylic rubber which has high processability and is capable of providing a cross-linked rubber having high elongation at break and high tensile strength, and a rubber composition and a cross-linked rubber obtained using such an acrylic rubber.

Means for Solving Problems

The present inventor, who has conducted extensive research to solve the above problems, has found that the above objective can be achieved by an acrylic rubber comprising at least one cross-linkable group-containing monomer unit selected from the group consisting of carboxyl group-containing monomer units, halogen atom-containing monomer units, and epoxy group-containing monomer units, and an (meth)acrylamide monomer unit, wherein the amount of the (meth)acrylamide monomer unit is 0.2 to 17.5% by weight of the total monomer units. This finding has led to the completion of the present invention.

Specifically, the present invention provides an acrylic rubber comprising at least one cross-linkable group-containing monomer unit selected from the group consisting of carboxyl group-containing monomer units, halogen atom-containing monomer units, and epoxy group-containing monomer units, and an (meth)acrylamide monomer unit, wherein the amount of the (meth)acrylamide monomer unit is 0.2 to 17.5% by weight of the total monomer units.

In the acrylic rubber according to the present invention, the amount of the (meth)acrylamide monomer unit is preferably 1 to 15% by weight of the total monomer units.

In the acrylic rubber according to the present invention, the cross-linkable group-containing monomer unit is preferably a carboxyl group-containing monomer unit.

The present invention provides a rubber composition comprising a rubber component including the acrylic rubber described above, and a cross-linking agent.

The present invention provides a cross-linked rubber obtained by cross-linking the rubber composition described above.

Effects of Invention

The present invention can provide an acrylic rubber which has high processability and is capable of providing a cross-linked rubber having high elongation at break and high tensile strength, and a rubber composition and a cross-linked rubber obtained using such an acrylic rubber.

DESCRIPTION OF EMBODIMENTS

<Acrylic Rubber>

The acrylic rubber according to the present invention comprises at least one cross-linkable group-containing monomer unit selected from the group consisting of carboxyl group-containing monomer units, halogen atom-containing monomer units, and epoxy group-containing monomer units, and an (meth)acrylamide monomer unit, wherein the amount of the (meth)acrylamide monomer unit is 0.2 to 17.5% by weight of the total monomer units.

The acrylic rubber according to the present invention refers to a rubbery polymer comprising an (meth)acrylic acid ester monomer unit as a main component (which refers to a component occupying preferably 30% by weight or more of the total monomer units in the acrylic rubber) in the molecule (where the term (meth)acrylic acid ester monomer means an acrylate ester monomer and/or a methacrylic acid ester monomer. Hereinafter, the same holds for methyl (meth)acrylate and others.).

Examples of (meth)acrylic acid ester monomers which can form the (meth)acrylic acid ester monomer unit as the main component of the acrylic rubber according to the present invention include, but should not be limited to, alkyl (meth)acrylate ester monomers, alkoxyalkyl (meth)acrylate ester monomers, and the like.

Although alkyl (meth)acrylate ester monomers are not particularly limited, preferred are (meth)acrylic acid esters of $C_1$ to $C_{12}$ alkanols ((meth)acrylic acid esters having a C to $C_{12}$ alkyl group), more preferred are (meth)acrylic acid esters of $C_1$ to $C_8$ alkanols ((meth)acrylic acid esters having a $C_1$ to $C_5$ alkyl group), and still more preferred are (meth) acrylic acid esters of $C_2$ to $C_6$ alkanols ((meth)acrylic acid esters having a $C_2$ to Co alkyl group).

Specific examples of such alkyl (meth)acrylate ester monomers include methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, 2-ethylhexyl (meth)acrylate, cyclohexyl (meth)acrylate, and the like. Among these, preferred are ethyl (meth)acrylate and n-butyl (meth)acrylate, and more preferred are ethyl acrylate and n-butyl acrylate. These can be used alone or in combination. In particular, preferred is use of ethyl acrylate in combination with n-butyl acrylate, and the weight ratio of "ethyl acrylate unit:n-butyl acrylate unit" is preferably 20:80 to 80:20, more preferably 40:60 to 60:40.

Although alkoxyalkyl (meth)acrylate ester monomers are not particularly limited, preferred are (meth)acrylic acid esters of $C_2$ to $C_{12}$ alkoxyalkyl alcohols ((meth)acrylic acid esters having a $C_2$ to $C_{12}$ alkoxyalkyl group), more preferred are (meth)acrylic acid esters of $C_2$ to $C_8$ alkoxyalkyl alcohols ((meth)acrylic acid esters having a $C_2$ to $C_8$ alkoxyalkyl group), and still more preferred are (meth)acrylic acid esters of $C_2$ to $C_6$ alkoxyalkyl alcohols ((meth)acrylic acid esters having a $C_2$ to $C_6$ alkoxyalkyl group).

Specific examples of such alkoxyalkyl (meth)acrylate ester monomers include methoxymethyl (meth)acrylate, ethoxymethyl (meth)acrylate, 2-methoxyethyl (meth)acrylate, 2-ethoxyethyl (meth)acrylate, 2-propoxyethyl (meth) acrylate, 2-butoxyethyl (meth)acrylate, 3-methoxypropyl (meth)acrylate, 4-methoxybutyl (meth)acrylate, and the like. Among these, preferred are 2-ethoxyethyl (meth)acrylate and 2-methoxyethyl (meth)acrylate, and particularly preferred are 2-ethoxyethyl acrylate and 2-methoxyethyl acrylate. These can be used alone or in combination.

The amount of the (meth)acrylic acid ester monomer unit is preferably 50% by weight or more, more preferably 60% by weight or more, still more preferably 70 to 99.79% by weight, further still more preferably 80 to 99.5% by weight, particularly preferably 90 to 99% by weight in the total monomer units in the acrylic rubber according to the present invention. An excessively small amount of the (meth)acrylic acid ester monomer unit may result in reduced weatherability, heat resistance, and oil resistance of a cross-linked rubber to be obtained.

Besides of the (meth)acrylic acid ester monomer unit, the acrylic rubber according to the present invention may contain at least one cross-linkable group-containing monomer unit selected from the group consisting of carboxyl group-containing monomer units, halogen atom-containing monomer units, and epoxy group-containing monomer units. From the viewpoint of crosslinkability, as the cross-linkable group-containing monomer unit, preferred are carboxyl group-containing monomer units and halogen atom-containing monomer units, and more preferred are carboxyl group-containing monomer units.

Any carboxyl group-containing monomer can be used without limitation to form a carboxyl group-containing monomer unit as long as it is a monomer having a carboxyl group. Examples thereof include α,β-ethylenically unsaturated monocarboxylic acids, α,β-ethylenically unsaturated dicarboxylic acids, α,β-ethylenically unsaturated dicarboxylic acid monoesters, and the like. When a α,β-ethylenically unsaturated carboxylic acid monomer is used, the acrylic rubber can be obtained as a carboxyl group-containing acrylic rubber having a carboxyl group as a cross-linking point, which, in turn, can be formed into a cross-linked rubber having further enhanced compression set resistance.

Although not particularly limited, preferred α,β-ethylenically unsaturated monocarboxylic acids are $C_3$ to $C_{12}$ α,β-ethylenically unsaturated monocarboxylic acids. Specific examples thereof include acrylic acid, methacrylic acid, α-ethylacrylic acid, crotonic acid, cinnamic acid, and the like.

Although not particularly limited, preferred α,β-ethylenically unsaturated dicarboxylic acids are $C_4$ to $C_{12}$ α,β-ethylenically unsaturated dicarboxylic acids. Specific examples thereof include butenedioic acids such as fumaric acid and maleic acid; itaconic acid; citraconic acid; chloromaleic acid; and the like.

Although not particularly limited, preferred monoesters of, β-ethylenically unsaturated dicarboxylic acids are monoesters of $C_4$ to $C_{12}$ α,β-ethylenically unsaturated dicarboxylic acids and C to $C_{12}$ alkanols. More preferred are monoesters of $C_4$ to $C_6$ α,β-ethylenically unsaturated dicarboxylic acids and $C_2$ to $C_5$ alkanols, and still more preferred are monoesters of $C_4$ butenedioic acid and $C_2$ to $C_6$ alkanols. Specific examples of the monoesters of α,β-ethylenically unsaturated dicarboxylic acids include linear monoalkyl esters of butenedioic acid such as monomethyl fumarate, monoethyl fumarate, mono-n-butyl fumarate, monomethyl maleate, monoethyl maleate, and mono-n-butyl maleate; butenedioic acid monoesters having an alicyclic structure such as monocyclopentyl fumarate, monocyclohexyl fumarate, monocyclohexenyl fumarate, monocyclopentyl maleate, monocyclohexyl maleate, and monocyclohexenyl maleate; itaconic acid monoesters such as monomethyl itaconate, monoethyl itaconate, mono-n-butyl itaconate, and monocyclohexyl itaconate; and the like.

Among these, preferred are α,β-ethylenically unsaturated dicarboxylic acid monoesters, more preferred are linear monoalkyl esters of butenedioic acid and butenedioic acid monoesters having an alicyclic structure, still more preferred are mono-n-butyl fumarate, mono-n-butyl maleate, monocyclohexyl fumarate, and monocyclohexyl maleate, and particularly preferred is mono-n-butyl fumarate. These α,β-ethylenically unsaturated carboxylic acid monomers can be used alone or in combination. Among these monomers listed above, the dicarboxylic acids include those present as anhydrides thereof.

Examples of halogen atom-containing monomers which can form halogen atom-containing monomer units include, but should not be limited to, unsaturated alcohol esters of halogen-containing saturated carboxylic acids, haloalkyl (meth)acrylates, haloacyloxyalkyl (meth)acrylates, (haloacetylcarbamoyloxy)alkyl (meth)acrylates, halogen-containing unsaturated ethers, halogen-containing unsaturated ketones, halomethyl group-containing aromatic vinyl compounds, halogen-containing unsaturated amides, haloacetyl group-containing unsaturated monomers, and the like. Note that preferred halogen atom-containing monomers are those containing a chlorine atom as a halogen atom.

Specific examples of unsaturated alcohol esters of halogen-containing saturated carboxylic acids include vinyl monochloroacetate, vinyl 2-chloropropionate, allyl chloroacetate, and the like.

Specific examples of haloalkyl (meth)acrylates include chloromethyl (meth)acrylate, 1-chloroethyl (meth)acrylate, 2-chloroethyl (meth)acrylate, 1,2-dichloroethyl (meth)acrylate, 2-chloropropyl (meth)acrylate, 3 -chloropropyl (meth) acrylate, 2,3-dichloropropyl (meth)acrylate, and the like.

Specific examples of haloacyloxyalkyl (meth)acrylates include 2-(chloroacetoxy)ethyl (meth)acrylate, 2-(chloroacetoxy)propyl (meth)acrylate, 3-(chloroacetoxy)propyl (meth)acrylate, 3-(hydroxychloroacetoxy)propyl (meth) acrylate, and the like.

Specific examples of (haloacetylcarbamoyloxy)alkyl (meth)acrylates include 2-(chloroacetylcarbamoyloxy)ethyl (meth)acrylate, 3-(chloroacetylcarbamoyloxy)propyl (meth) acrylate, and the like.

Specific examples of halogen-containing unsaturated ethers include chloromethylvinyl ether, 2-chloroethylvinyl ether, 3-chloropropylvinyl ether, 2-chloroethylallyl ether, 3-chloropropylallyl ether, and the like.

Specific examples of halogen-containing unsaturated ketones include 2-chloroethylvinyl ketone, 3-chloropropylvinyl ketone, 2-chloroethylallyl ketone, and the like.

Specific examples of halomethyl group-containing aromatic vinyl compounds include p-chloromethylstyrene, m-chloromethylstyrene, o-chloromethylstyrene, p-chloromethyl-α-methylstyrene, and the like.

Specific examples of halogen-containing unsaturated amides include N-chloromethyl (meth)acrylamide, and the like.

Specific examples of haloacetyl group-containing unsaturated monomers include 3-(hydroxychloroacetoxy)propyl allyl ether, p-vinylbenzyl chloroacetate, and the like.

These halogen atom-containing monomers can be used alone or in combination. Among these halogen atom-containing monomers, preferred are unsaturated alcohol esters of halogen-containing saturated carboxylic acids, and more preferred is vinyl monochloroacetate.

Examples of epoxy group-containing monomers which can form epoxy group-containing monomer units include, but should not be limited to, epoxy group-containing (meth) acrylic acid esters such as glycidyl (meth)acrylate; epoxy group-containing ethers such as allyl glycidyl ether and vinyl glycidyl ether; and the like. These epoxy group-containing monomers can be used alone or in combination. Among these epoxy group-containing monomers, preferred are epoxy group-containing (meth)acrylic acid esters, and more preferred is glycidyl methacrylate.

The amount of the cross-linkable group-containing monomer unit is preferably 0.01% by weight or more, more preferably 0.01 to 20% by weight, still more preferably 0.1 to 10% by weight, further still more preferably 0.5 to 5% by weight, particularly preferably 1 to 3% by weight of the total monomer units in the acrylic rubber according to the present invention. The presence of the cross-linkable group-containing monomer unit within the ranges above enables formation of a cross-linked rubber having high tensile strength and high elongation at break and having more appropriately enhanced compression set resistance.

The acrylic rubber according to the present invention contains an (meth)acrylamide monomer unit as well as the (meth)acrylic acid ester monomer unit as the main component and the cross-linkable group-containing monomer unit described above. Although either acrylamide or methacrylamide can be used as the (meth)acrylamide monomer, suitable is acrylamide. Both acrylamide and methacrylamide may be used in combination.

The amount of the (meth)acrylamide monomer unit is 0.2 to 17.5% by weight, preferably 1 to 15% by weight, more preferably 2 to 10% by weight of the total monomer units in the acrylic rubber according to the present invention. The presence of the (meth)acrylamide monomer unit within the ranges above enables formation of a cross-linked rubber having excellent tensile strength and elongation at break and can provide increased processability to the acrylic rubber composition. When the amount of the (meth)acrylamide monomer unit is less than the ranges above or the acrylic rubber contains no (meth)acrylamide monomer unit, the rubber, when kneaded with a roll, adheres to the roll surface, and thus has poor processability. Additionally, a cross-linked rubber formed therefrom has poor elongation at break and poor tensile strength. Conversely, when the amount of the (meth)acrylamide monomer unit is more than the ranges above, the polymer dissolves in water, which may make it difficult to recover the acrylic rubber by coagulation or may lead to poor water resistance.

In addition to the (meth)acrylic acid ester monomer unit, the cross-linkable group-containing monomer unit, and the (meth)acrylamide monomer unit, the acrylic rubber according to the present invention may contain units of an additional monomer copolymerizable therewith. Examples of such an additional copolymerizable monomer include, but should not be limited to, aromatic vinyl monomers, x, β-ethylenically unsaturated nitrile monomers, α,β-ethylenically unsaturated dicarboxylic acid diester monomers, diene monomers, non-conjugated diene monomers, other olefin monomers, and the like.

Examples of aromatic vinyl monomers include styrene, α-methylstyrene, divinylbenzene, and the like.

Examples of α,β-ethylenically unsaturated nitrile monomers include acrylonitrile, methacrylonitrile, and the like.

Examples of α,β-ethylenically unsaturated dicarboxylic acid diester monomers include maleic acid dialkyl esters having $C_1$ to $C_{18}$ alkyl groups, such as dimethyl maleate and di-n-butyl maleate; fumaric acid dialkyl esters having $C_1$ to $C_{18}$ alkyl groups, such as dimethyl fumarate and di-n-butyl fumarate; maleic acid dicycloalkyl esters having $C_4$ to $C_{16}$ cycloalkyl groups, such as dicyclopentyl maleate and dicyclohexyl maleate; fumaric acid dicycloalkyl esters having $C_4$ to $C_{16}$ cycloalkyl groups such as dicyclopentyl fumarate and dicyclohexyl fumarate; itaconic acid dialkyl esters having $C_1$ to $C_{18}$ alkyl groups such as dimethyl itaconate and di-n-butyl itaconate; itaconic acid dicycloalkyl esters having $C_4$ to $C_{16}$ cycloalkyl groups, such as dicyclohexyl itaconate; and the like.

Examples of other olefin monomers include ethylene, propylene, vinyl chloride, vinylidene chloride, vinyl acetate, ethyl vinyl ether, butyl vinyl ether, and the like.

Examples of diene monomers include conjugated diene monomers and non-conjugated diene monomers.

Specific examples of conjugated diene monomers include 1,3-butadiene, isoprene, piperylene, and the like.

Specific examples of non-conjugated diene monomers include ethylidene norbornene, dicyclopentadiene, dicyclopentadienyl (meth)acrylate, 2-dicyclopentadienylethyl (meth)acrylate, and the like.

Among these additional copolymerizable monomers, preferred are styrene, acrylonitrile, methacrylonitrile, ethylene, and vinyl acetate, and more preferred are acrylonitrile, methacrylonitrile, and ethylene.

These additional copolymerizable monomers can be used alone or in combination. The amount of units of the additional copolymerizable monomer (s) is preferably 49.9% by weight or less, more preferably 29.9% by weight or less, still more preferably 15% by weight or less, further still more preferably 9% by weight or less, particularly preferably 4.5% by weight or less of the monomer units in the acrylic rubber according to the present invention.

When the acrylic rubber according to the present invention contains units of the additional copolymerizable monomer (s), the content thereof can be controlled within the ranges above. Especially, in the case where ethylene units are present, the amount of ethylene units is preferably 9% by weight or less, more preferably 4.5% by weight or less of the monomer units in the acrylic rubber according to the present invention. Likewise, when the acrylic rubber according to the present invention contains acrylonitrile units and methacrylonitrile units, the total content of acrylonitrile units and methacrylonitrile units is preferably 9% by weight or less, more preferably 4.5% by weight or less.

The acrylic rubber according to the present invention preferably contains a phenolic antioxidant as an antioxidant. The phenolic antioxidant can be any compound without limitation as long as it has a phenol structure (namely, a structure having a benzene ring and an OH group bonded to the benzene ring). Examples of the phenolic antioxidant include sterically hindered phenolic antioxidants, semi-hindered phenolic antioxidants, less hindered phenolic antioxidants, phenolic antioxidants having no hindered group, and the like.

The sterically hindered phenolic antioxidant is a phenolic compound having a phenolic structure in which hindered groups are present at 2 and 6 positions (namely, two ortho positions) with respect to the OH group (phenolic hydroxyl group). The hindered groups can be any bulky groups without limitation. Examples thereof include substituents having 4 or more carbon atoms. Specific examples of the hindered groups include tertiary alkyl groups such as t-butyl, t-pentyl, and t-hexyl groups; secondary alkyl groups such as sec-butyl and sec-pentyl groups; branched primary alkyl groups such as i-butyl and i-pentyl groups; cycloalkyl groups such as cyclohexyl and cyclopentyl groups; alkyl groups having an alkylthio substituted so that the number of carbon becomes 4 or more in total, such as octylthio and octylthiomethyl groups; and the like.

Specific examples of sterically hindered phenolic antioxidants include pentaerythritol tetrakis[3-(3,5-di-tert-butyl-4-hydroxyphenyl)propionate] (such as a trade name "Irganox 1010", available from BASF SE), 1, 3,5-tris(3,5-di-tert-butyl-4-hydroxybenzyl) isocyanurate (such as a trade name "Irganox 3114", available from BASF SE), 2, 4,6-tris(4-hydroxy-3,5-di-tert-butylbenzyl)mesitylene (such as a trade name "Irganox 1330", available from BASF SE), 6-(4-hydroxy-3,5-di-tert-butylanilino)-2,4-bis(octylthio)-1,3,5-triazine (such as a trade name "Irganox 565", available from BASF SE), 2,2'-thiodiethyl bis[3-(3,5-di-tert-butyl- 4-hydroxyphenyl)propionate] (such as a trade name "Irganox 1035", available from BASF SE), 1,2-bis[3-(4-hydroxy-3, 5-di-tert-butylphenyl) propionyl]hydrazine (trade name "Irganox MD 1024", available from BASF SE), octyl 3-(3, 5-di-tert-butyl-4-hydroxyphenyl)propionate (trade name "Irganox 1135", available from BASF SE), N, N'-hexamethylenebis[3-(3,5-di-tert-butyl-4-hydroxyphenyl)propanamide] (trade name "Irganox 1098", available from BASF SE), 1,6-hexanediol bis[3-(3,5-di-tert-butyl-4-hydroxyphenyl)propionate] (trade name "Irganox 259", available from BASF SE), stearyl 3-(3,5-di-tert-butyl-4-hydroxyphenyl) propionate (trade name "Irganox 1076", available from BASF SE), and the like.

The semi-hindered phenolic antioxidant is a phenolic compound having a phenol structure in which a hindered group is present at either one of 2 and 6 positions with respect to the OH group (phenolic hydroxyl group) and an alkyl group having 3 or less carbon atoms, such as a methyl group (preferably, a methyl group), is present at the other thereof.

Specific examples of semi-hindered phenolic antioxidants include 4,6-bis(octylthiomethyl)-o-cresol (trade name "Irganox 1520L", available from BASF SE), 1,3,5-tris[[4-(1,1-dimethylethyl)-3-hydroxy-2,6-dimethylphenyl] methyl]-1,3,5-triazine-2,4,6 (1H, 3H, 5H)-trione (trade name "Irganox 1790", available from BASF SE), 3,9-bis[2-{3-(3-tertiarybutyl-4-hydroxy-5-methylphenyl)propionyloxy}-1,1-dimethylethyl]-2,4,8,10-tetraoxaspiro[5,5] undecane (such as a trade name "Adekastab A0-80", available from ADEKA CORPORATION), ethylene bis(oxyethylene) bis[3-(5-tert-butyl-hydroxy-m-tolyl) propionate] (such as a trade name "Irganox 245", available from BASF SE), triethylene glycol bis[3-(3-tert-butyl-4-hydroxy-5-methylphenyl)propionate] (such as a trade name "Adekastab A0-70", available from ADEKA CORPORATION), and the like.

The less hindered phenolic antioxidant is a phenolic compound having a phenol structure in which a hindered group is present at either one of 2 and 6 positions with respect to the OH group (phenolic hydroxyl group) and a hydrogen atom is present at the other thereof.

Specific examples of less hindered phenolic antioxidants include 1,1,3-tris-(2-methyl-4-hydroxy-5-tertiary butylphenyl) butane (such as a trade name "Adekastab AO-30", available from ADEKA CORPORATION), 4,4'-butylidenebis(6-t-butyl-3-methylphenol) (such as a trade name "Adekastab AO-40", available from ADEKA CORPORATION), 4,4'-thiobis(6-t-butyl-3-methylphenol) (such as a trade name "Sumilizer WX-R", available from Sumitomo Chemical Co., Ltd.), and the like.

These phenolic antioxidants can be used alone or in combination. Among these phenolic antioxidants, preferred are sterically hindered phenolic antioxidants and semi-hindered phenolic antioxidants, and preferred are sterically hindered phenolic antioxidants because these can appropriately suppress coloring and generation of an odor.

The phenolic antioxidant has a molecular weight of preferably 470 or less, more preferably 100 to 450, still more preferably 150 to 400. Use of a phenolic antioxidant having a molecular weight of 500 or less can more appropriately suppress coloring and generation of an odor.

The amount of the phenolic antioxidant is preferably 0.1 to 5 parts by weight, more preferably 0.2 to 3.0 parts by weight, still more preferably 0.3 to 2.0 parts by weight relative to 100 parts by weight of the acrylic rubber component. When the phenolic antioxidant is used in an amount within the ranges above, it can more appropriately suppress coloring and generation of an odor.

The Mooney viscosity (ML1+4, 100° C.) of the acrylic rubber according to the present invention is in the range of preferably 10 to 150, more preferably 20 to 100, particularly preferably 25 to 70, although not particularly limited. An acrylic rubber having a Mooney viscosity within the ranges above can have highly balanced processability and strength properties.

Furthermore, the pH of the acrylic rubber according to the present invention is preferably 6 or less, more preferably 2 to 6, still more preferably 2.5 to 5.5, particularly preferably 3 to 5, although not particularly limited. When the pH falls within the ranges above, the acrylic rubber can have further enhanced storage stability.

From the viewpoint of providing more favorable mechanical strength and processability, the weight average molecular weight (Mw) of the acrylic rubber according to the present invention is preferably 800,000 or more, more preferably 800,000 to 2,600,000, still more preferably 900,000 to 2,300,000, particularly preferably 1,000,000 to 2,000,000, although not particularly limited. Although the molecular weight distribution of the acrylic rubber is not particularly limited, the value of Mw/Mn is preferably 1.50 to 10.0, more preferably 1.70 to 8.00, still more preferably 2.00 to 6.00, and the value of Mz/Mw is preferably 1.30 to 3.00, more preferably 1.45 to 2.70, still more preferably 1.60 to 2.50. The weight average molecular weight of the acrylic rubber and the molecular weight distribution thereof can be determined as an absolute molecular weight and an absolute molecular weight distribution by a GPC-MALS method using a gel permeation chromatograph (GPC)provided with a multi-angle laser light scattering (MALS) detector, for example.

The method for producing the acrylic rubber according to the present invention is not particularly limited, and any method can be used. For example, the following method is suitable. Specifically, the acrylic rubber according to the present invention can be produced by emulsion polymerizing monomer components for forming the acrylic rubber, which contain the (meth)acrylic acid ester monomer, the cross-linkable group-containing monomer, and the (meth) acrylamide monomer, in the presence of a polymerization catalyst.

Examples of the monomer components used in emulsion polymerization include the monomers described above, and suitable monomers are those described above. The amounts of the monomers used may be appropriately selected in the composition ranges described above.

In emulsion polymerization, a standard method may be used, and an emulsifier, a polymerization initiator, a polymerization terminator, and the like can be used according to a normal method.

Although the emulsifier is not particularly limited, phosphate ester salts can be suitably used. A preferred phosphate ester salt is a compound represented by General Formula (1) below:

[Chem. 1]

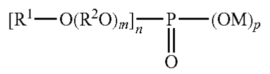

(1)

(where $R^1$ represents a linear or branched $C_4$ to $C_{20}$ alkyl or alkylphenyl group, or a $C_4$ to $C_{20}$ unsaturated alkyl group; $R^2$ represents a linear or branched $C_2$ or $C_3$ alkylene group; M represents an alkali metal; m is an integer of 1 to 20, when m is 2 or more, different groups may be present as $R^2$; n is 1 or 2; p is 1 or 2; and n+p is 3.)

In General Formula (1) above, $R^1$ represents a linear or branched $C_4$ to $C_{20}$ alkyl or alkylphenyl group, or a $C_4$ to $C_{20}$ unsaturated alkyl group. $R^1$ is preferably a group having 4 or more and 18 or less carbon atoms, more preferably a group having 5 or more and 16 or less carbon atoms, still more preferably a group having 6 or more and 14 or less carbon atoms. Specific examples of R' include n-octyl, n-decyl, n-dodecyl, n-tridecyl, n-tetradecyl, isooctyl, isotridecyl, n-octadecyl, nonylphenyl groups, and the like.

In General Formula (1), $R^2$ represents a linear or branched $C_2$ or $C_3$ alkylene group. Specific examples of $R^2$ include an ethylene group, a propylene group, and the like. Among these, more preferred is an ethylene group.

In General Formula (1), M represents an alkali metal. Specific examples of M include sodium, potassium, lithium, rubidium, cesium, and the like. Among these, M is preferably sodium or potassium.

In General Formula (1) above, m is an integer of 1 to 20, preferably 2 or more and 15 or less, more preferably 2 or more and 13 or less, still more preferably 2 or more and 11 or less. When m is 2 or more, different groups may be present as $R^2$. Specifically, for example, both an ethylene group and a propylene group may be present as $R^2$.

In General Formula (1), n is 1 or 2, preferably 1. Moreover, p is 1 or 2, preferably 2. n+p is 3.

These phosphate ester salts may be used alone, in combination of two or more of them where n is different or two or more of them where ester species are different. Among these combinations, preferred are mixtures of phosphate ester salts where n is different, and more preferred are mixtures of phosphate ester salts where the ester species are the same and n is different. In the mixtures of phosphate ester salts where n is different, the mixing ratios are not particularly limited. The amount of the phosphate ester salt (s) is preferably 0.01 to 10 parts by weight, more preferably 0.1 to 5 parts by weight, still more preferably 1 to 3 parts by weight relative to 100 parts by weight of the monomer components used in polymerization.

Examples of the phosphate ester salts represented by General Formula (1) above include alkali metal salts (such as Na salts and K salts) of octyloxydi(oxyethylene)phosphate ester, dodecyloxydi(oxyethylene)phosphate ester, tridecyloxytri(oxyethylene)phosphate ester, hexyloxytetra (oxyethylene)phosphate ester, heptylhexaoxytetra (oxyethylene)phosphate ester, octyloxytetra(oxyethylene) phosphate ester, nonyloxytetra(oxyethylene)phosphate ester, decyloxytetra(oxyethylene)phosphate ester, decyloxytetra(oxyethylene)phosphate ester, octadecyloxytetra (oxyethylene)phosphate ester, nonylphenyloxytetra(oxyethylene)phosphate ester, tridecyloxytetra(oxyethylene) phosphate ester, octyloxyhexa(oxyethylene)phosphate ester, decyloxyhexa(oxyethylene)phosphate ester, tridecyloxyhexa(oxyethylene)phosphate ester, nonylphenyloxyhexa (oxyethylene)phosphate ester, octadecyloxyhepta (oxyethylene)phosphate ester, and tridecyloxydeca (oxyethylene) phosphate ester. In these phosphate ester salts, their hydrophobic group can have any structure, which may be either linear or branched, and may have an unsaturated structure.

In the present invention, in addition to or instead of a phosphate ester salt, an emulsifier other than the phosphate ester salt can also be used. Examples of the emulsifier other than the phosphate ester salt include anionic emulsifiers other than the phosphate ester salts, cationic emulsifiers, nonionic emulsifiers, and the like. Among these, anionic emulsifiers other than the phosphate ester salts and nonionic emulsifiers are suitable. Preferred is use of an anionic emulsifier other than the phosphate ester salts in combination with a nonionic emulsifier.

Examples of anionic emulsifiers other than the phosphate ester salts include, but should not be limited to, salts of fatty acids such as myristic acid, palmitic acid, oleic acid, and linolenic acid; alkylbenzene sulfonates such as sodium dodecylbenzenesulfonate; sulfate salts such as sodium lauryl sulfate; alkyl sulfosuccinates; and the like.

Examples of cationic emulsifiers include, but should not be limited to, alkyl trimethyl ammonium chlorides, dialkyl ammonium chlorides, benzyl ammonium chloride, and the like.

Examples of nonionic emulsifiers include, but should not be limited to, polyoxyalkylene fatty acid esters such as polyoxyethylene stearate ester; polyoxyalkylene alkyl ethers such as polyoxyethylene dodecyl ether; polyoxyalkylene alkyl phenol ethers such as polyoxyethylene nonyl phenyl ether; polyoxyethylene sorbitan alkyl esters; and the like. Among these, preferred are polyoxyalkylene alkyl ethers and polyoxyalkylene alkyl phenol ethers, and more preferred are polyoxyethylene alkyl ethers and polyoxyethylene alkyl phenol ethers.

These emulsifiers other than the phosphate ester salts can be used alone or in combination.

The total amount of the emulsifier (s) used is preferably 0.01 to 10 parts by weight, more preferably 0.1 to 5 parts by weight, still more preferably 1 to 3 parts by weight relative to 100 parts by weight of the monomer components used in polymerization. When an anionic emulsifier other than the phosphate ester salts is used in combination with a nonionic emulsifier, the amount of the nonionic emulsifier is more than 0 parts by weight and 4 parts by weight or less, preferably 0.1 to 3 parts by weight, more preferably 0.5 to 2 parts by weight, still more preferably 0.7 to 1.7 parts by weight relative to 100 parts by weight of the monomer used in polymerization, and the amount of the anionic emulsifier other than the phosphate ester salts is more than 0 parts by weight and 4 parts by weight or less, preferably 0.1 to 3 parts by weight, more preferably 0.5 to 2 parts by weight, still more preferably 0.35 to 0.75 parts by weight relative to 100 parts by weight of the monomer used in polymerization. When an anionic emulsifier other than the phosphate ester salts is used in combination with a nonionic emulsifier, the weight ratio of the nonionic emulsifier to the anionic emulsifier other than the phosphate ester salt is preferably 1/99 to 99/1, more preferably 10/90 to 80/20, still more preferably 25/75 to 75/25, further still more preferably 50/50 to 75/25, particularly preferably 65/35 to 75/25.

In emulsion polymerization, preferably, monomer components containing an (meth)acrylic acid ester as a main component are preliminarily emulsified using water and an emulsifier to prepare an emulsion, and the obtained emulsion is emulsion polymerized in the presence of a polymerization catalyst. In this operation, any method can be used without limitation to emulsify the monomer components containing an (meth)acrylic acid ester as a main component using water and an emulsifier. Preferred is a method of mixing the monomer components with water and an emulsifier, and more preferred is a method of stirring the monomer components, water, and an emulsifier using a stirrer such as a homogenizer or a disk turbine.

The amount of water used to emulsify the monomer components is preferably 5 to 500 parts by weight, more preferably 10 to 300 parts by weight, still more preferably 20 to 200 parts by weight relative to 100 parts by weight of the monomer components used in polymerization.

Any polymerization catalyst can be used, and those generally used in emulsion polymerization can be used without limitation. As the polymerization catalyst, a redox catalyst composed of a radical generator and a reductant can be used, for example.

Examples of the radical generator include peroxides, azo compounds, and the like. Among these, preferred are peroxides. Among these peroxides, either an inorganic peroxide or an organic peroxide may be used.

Examples of inorganic peroxides include sodium persulfate, potassium persulfate, hydrogen peroxide, ammonium persulfate, and the like. Among these, preferred are potassium persulfate, hydrogen peroxide, and ammonium persulfate, and particularly preferred is potassium persulfate.

Examples of organic peroxides include 2,2-di(4,4-di-(t-butylperoxy) cyclohexyl)propane, 1-di-(t-hexylperoxy)cyclohexane, 1,1-di-(t-butylperoxy) cyclohexane, n-butyl 4,4-di-(t-butylperoxy) valerate, 2,2-di-(t-butylperoxy)butane, t-butyl hydroperoxide, cumene hydroperoxide, diisopropylbenzene hydroperoxide, paramenthane hydroperoxide, benzoyl peroxide, 1,1,3,3-tetraethylbutyl hydroperoxide, t-butyl cumyl peroxide, di-t-butyl peroxide, di-t-hexyl peroxide, di (2-t-butylperoxyisopropyl) benzene, dicumyl peroxide, diisobutyryl peroxide, di (3,5,5-trimethylhexanoyl)peroxide, dilauroyl peroxide, disuccinic acid peroxide, dibenzoyl peroxide, di (3-methylbenzoyl)peroxide, benzoyl (3-methylbenzoyl)peroxide, diisobutyryl peroxydicarbonate, di-n-propyl peroxydicarbonate, di (2-ethylhexyl)peroxydicarbonate, di-sec-butyl peroxydicarbonate, 1,1,3,3-tetramethylbutyl peroxyneodecanoate, t-hexyl peroxypivalate, t-butyl peroxyneodecanoate, t-hexyl peroxypivalate, t-butyl peroxypivalate, 2,5-dimethyl-2,5-di(2-ethylhexanoylperoxy) hexane, 1,1,3,3-tetramethylbutyl peroxy-2-ethylhexanoate, t-hexylperoxy-2-ethylhexanoate, t-butylperoxy-3,5,5-trimethyl hexanoate, t-hexylperoxy isopropyl monocarbonate, t-butylperoxy isopropyl monocarbonate, t-butylperoxy-2-ethylhexyl monocarbonate, 2,5-dimethyl-2,5-di (benzoylperoxy) hexane, t-butyl peroxyacetate, t-hexyl peroxybenzoate, t-butyl peroxybenzoate, 2,5-dimethyl-2,5-di(t-butylperoxy) hexane, and the like. Among these, preferred are diisopropylbenzene hydroperoxide, cumene hydroperoxide, paramenthane hydroperoxide, and benzoyl peroxide.

Examples of azo compounds include azobisisobutyronitrile, 4,4'-azobis(4-cyanovaleric acid), 2,2'-azobis[2-(2-imidazolin-2-yl)propane, 2,2'-azobis(propane-2-carboamidine), 2,2'-azobis[N-(2-carboxyethyl)-2-methylpropaneamide], 2,2'-azobis {2-[1-(2-hydroxyethyl)-2-imidazolin-2-yl]propane}, 2,2'-azobis(1-imino-1-pyrrolidino-2-methylpropane), 2,2'-azobis {2-methyl-N-[1,1-bis(hydroxymethyl)-2-hydroxyethyl]propaneamide}, and the like.

These radical generators can be used alone or in combination. The amount of the radical generator used is preferably 0.0001 to 5 parts by weight, more preferably 0.0005 to 1 part by weight, still more preferably 0.001 to 0.5 parts by weight relative to 100 parts by weight of the monomer components used in polymerization.

The radical generator can be used in combination with any reductant as long as it is used as a redox catalyst for emulsion polymerization. At least two reductants are preferably used. Among these, suitable is a combination of a reduced-metal ion compound and a reductant other than that.

Examples of reduced-metal ion compounds include, but should not be limited to, ferrous sulfate, hexamethylenediaminetetraacetic acid ferric sodium salt, cuprous naphthenate, and the like. Among these, preferred is ferrous sulfate.

These reduced-metal ion compounds can be used alone or in combination. The amount of the reduced-metal ion compound used is in the range of preferably 0.000001 to 0.01 parts by weight, more preferably 0.00001 to 0.001 parts by weight, still more preferably 0.00005 to 0.0005 parts by weight relative to 100 parts by weight of the monomer components used in polymerization.

Examples of reductants other than the reduced-metal ion compounds include, but should not be limited to, ascorbic acid or salts thereof such as ascorbic acid, sodium ascorbate, and potassium ascorbate; erythorbic acid or salts thereof such as erythorbic acid, sodium erythorbate, and potassium erythorbate; sulfinate salts such as sodium hydroxymethanesulfinate (sodium formaldehyde sulfoxylate); sulfite salts such as sodium sulfite, potassium sulfite, sodium hydrogen sulfite, aldehyde sodium hydrogen sulfite, and potassium hydrogen sulfite; pyrosulfite salts such as sodium pyrosulfite, potassium pyrosulfite, sodium hydrogen pyrosulfite, and potassium hydrogen pyrosulfite; thiosulfate salts such as sodium thiosulfate and potassium thiosulfate; phosphorous acid or salts thereof such as phosphorous acid, sodium phosphite, potassium phosphite, sodium hydrogen phosphite, and potassium hydrogen phosphite; pyrophosphorus acid or salts thereof such as pyrophosphorus acid, sodium pyrophosphite, potassium pyrophosphite, sodium hydrogen pyrophosphite, and potassium hydrogen pyrophosphite; and the like. Among these, preferred are ascorbic acid or salts thereof and sodium hydroxymethanesulfinate (sodium formaldehyde sulfoxylate), and particularly preferred are ascorbic acid or salts thereof.

These reductants other than the reduced-metal ion compounds can be used alone or in combination. The reductant (s) other than the reduced-metal ion compounds is used in an amount of preferably 0.001 to 1 part by weight, more preferably 0.005 to 0.5 parts by weight, still more preferably 0.01 to 0.3 parts by weight relative to 100 parts by weight of the monomer components used in polymerization.

Examples of a preferred combination of the reduced-metal ion compound with a reductant other than the reduced-metal ion compound include a combination of ferrous sulfate with ascorbic acid or a salt thereof and/or sodium hydroxymethanesulfinate (sodium formaldehyde sulfoxylate). More preferred is a combination of ferrous sulfate with a salt of ascorbic acid and/or sodium hydroxymethanesulfinate (sodium formaldehyde sulfoxylate), and particularly preferred is a combination of ferrous sulfate with a salt of ascorbic acid. In this case, the amount of ferrous sulfate used is preferably 0.000001 to 0.01 parts by weight, more preferably 0.00001 to 0.001 parts by weight, still more preferably 0.00005 to 0.0005 parts by weight relative to 100 parts by weight of the monomer components used in polymerization, and the amount of ascorbic acid a salt thereof and/or sodium hydroxymethanesulfinate (sodium formaldehyde sulfoxylate) used is preferably 0.001 to 1 part by weight, more preferably 0.005 to 0.5 parts by weight, still more preferably 0.01 to 0.3 parts by weight relative to 100 parts by weight of the monomer components used in polymerization.

The amount of water used in emulsion polymerization is preferably 10 to 1000 parts by weight, more preferably 50 to 800 parts by weight, still more preferably 80 to 600 parts by weight, particularly preferably 100 to 400 parts by weight relative to 100 parts by weight of the monomer components used in polymerization. The amount of water used in emulsion polymerization is adjusted such that the total amount of water including water used in the emulsion of the monomer components falls within the ranges above, and emulsion polymerization may be performed using only water used in the emulsion of the monomer components, or additional water may be added to perform emulsion polymerization.

In emulsion polymerization, polymerization auxiliary materials such as a molecular weight modifier, a particle size adjuster, a chelating agent, and an oxygen scavenger can be used as needed.

Emulsion polymerization may be performed by any one of a batchwise method, a semi-batchwise method, and a continuous method. Preferred is a semi-batchwise method.

The polymerization temperature and the polymerization time are not particularly limited, and may be appropriately selected depending on the type of the polymerization catalyst used. The polymerization temperature is preferably 0 to 100° C., more preferably 5 to 80° C., still more preferably 10 to 50° C. The polymerization time is preferably 0.5 to 100 hours, more preferably 1 to 10 hours. The polymerization conversion ratio is preferably 80% by weight or more, more preferably 90% by weight or more, still more preferably 95% by weight or more although not particularly limited thereto.

When the polymerization reaction is stopped, a polymerization terminator can be used. Examples of polymerization terminators include hydroxylamine, hydroxyamine sulfurate, diethylhydroxyamine, hydroxyamine sulfonate and alkali metal salts thereof, sodium dimethyldithiocarbamate, hydroquinone, and the like. The amount of the polymerization terminator used is preferably 0.1 to 2 parts by weight relative to 100 parts by weight of the monomer components used in polymerization, although not particularly limited thereto.

In the present invention, preferably, a phenolic antioxidant is added to a polymer emulsion of acrylic rubber prepared by emulsion polymerization. When the phenolic antioxidant is added to the polymer emulsion of acrylic rubber, preferred is use of any of an addition method (1) and an addition method (2):

Addition method (1): a method of adding a phenolic antioxidant to the polymer emulsion of acrylic rubber under a condition at a temperature equal to or higher than the melting point of the phenolic antioxidant.

Addition method (2): a method of preparing a dispersion by bringing a phenolic antioxidant into contact with an emulsifier aqueous solution under a condition at a temperature equal to or higher than the melting point of the phenolic antioxidant, and then adding the dispersion of the phenolic antioxidant to the polymer emulsion of acrylic rubber.

When the phenolic antioxidant is added to the polymer emulsion of acrylic rubber, use of any of the addition method (1) and the addition method (2) enables the phenolic antioxidant to be homogeneously dispersed in the polymer emulsion and thus in the acrylic rubber after coagulation, thereby providing a sufficient addition effect thereof.

In the addition method (1), although a specific addition method for adding the phenolic antioxidant to the polymer emulsion of acrylic rubber under a condition at a temperature equal to or higher than the melting point of the phenolic antioxidant is not particularly limited, suitable is a method of controlling the temperature of the polymer emulsion to a temperature equal to or higher than the melting point of the phenolic antioxidant, and adding the phenolic antioxidant to the polymer emulsion. In particular, because generally an extremely small amount of the phenolic antioxidant is added to the polymer emulsion with respect to the amount of the polymer emulsion, it is simple and suitable to control the temperature of the polymer emulsion to a temperature equal to or higher than the melting point of the phenolic antioxidant.

In the addition method (1), although it is sufficient that the phenolic antioxidant is added to the polymer emulsion under a condition at a temperature equal to or higher than the melting point of the phenolic antioxidant, more preferred is addition under a condition at a temperature equal to or higher than the melting point +10° C. of the phenolic antioxidant used, and more preferred is addition under a condition at a temperature equal to or higher than the melting point +15° C. of the phenolic antioxidant used.

In the addition method (2), first, a dispersion of the phenolic antioxidant is prepared by bringing the phenolic antioxidant into contact with an emulsifier aqueous solution under a condition at a temperature equal to or higher than the melting point of the phenolic antioxidant.

Although any emulsifier can be used without limitation, preferred is use of the same emulsifier as those used in the emulsion polymerization described above from the viewpoint of dispersibility when the dispersion of the phenolic antioxidant is added to the polymer emulsion. When two or more emulsifiers are used in the emulsion polymerization described above, preferred is use of at least one of the two or more emulsifiers.

The emulsifier is used in an amount such that the concentration of the emulsifier in the dispersion of the phenolic antioxidant is preferably 0.5 to 20% by weight, more preferably 1.0 to 15% by weight, still more preferably 2.0 to 10% by weight. When the amount of the emulsifier used falls within the ranges above, the phenolic antioxidant can be sufficiently dispersed in the dispersion of the phenolic antioxidant, and thus the phenolic antioxidant can be more homogeneously dispersed when the dispersion of the phenolic antioxidant is added to the polymer emulsion.

Although any method can be used to bring the phenolic antioxidant into contact with the emulsifier aqueous solution under a condition at a temperature equal to or higher than the melting point of the phenolic antioxidant, suitable is a method of adjusting both the phenolic antioxidant and the emulsifier aqueous solution to a temperature equal to or higher than the melting point of the phenolic antioxidant, and adding the phenolic antioxidant to the emulsifier aqueous solution under stirring.

In the addition method (2), although it is sufficient that the phenolic antioxidant is brought into contact with the emulsifier aqueous solution under a condition at a temperature equal to or higher than the melting point of the phenolic antioxidant, preferred is addition under a condition at a temperature equal to or higher than the melting point +10° C. of the phenolic antioxidant used, and more preferred is addition under a condition at a temperature equal to or higher than the melting point +15° C. of the phenolic antioxidant used.

Although the content of the phenolic antioxidant in the dispersion of the phenolic antioxidant is not particularly limited, the phenolic antioxidant is contained in an amount such that the concentration thereof is preferably 10 to 80% by weight, more preferably 25 to 75% by weight, still more preferably 30 to 70% by weight. By adjusting the content of the phenolic antioxidant within the ranges above, the phenolic antioxidant can be more homogeneously dispersed when the dispersion of the phenolic antioxidant is added to the polymer emulsion.

In the addition method (2), the dispersion of the phenolic antioxidant thus prepared is then added to the polymer emulsion of acrylic rubber.

In addition of the antioxidant, it is sufficient that the phenolic antioxidant is added to the polymer emulsion in the amount such that the content thereof in the acrylic rubber falls within the ranges above, and the specific amount of the phenolic antioxidant added is preferably 0.1 to 5 parts by weight, more preferably 0.2 to 3 parts by weight, still more preferably 0.3 to 2 parts by weight relative to 100 parts by weight of the acrylic rubber component contained in the polymer emulsion. Because the phenolic antioxidant usually remains in the acrylic rubber after coagulation after a coagulation operation described later and the like are performed, the amount of the phenolic antioxidant added may be determined in consideration of this point.

In the next step, coagulation is performed by bringing a coagulant into contact with the polymer emulsion containing the phenolic antioxidant, thereby forming hydrous crumbs.

Any coagulant can be used without limitation. Examples thereof include mono- to trivalent metal salts. The mono- to trivalent metal salts are any salts containing metals which turn into mono- to trivalent metal ions when the salts are dissolved in water. Examples thereof include, but should not be limited to, salts of inorganic acids selected from hydrochloric acid, nitric acid, and sulfuric acid or organic acids such as acetic acid with a metal selected from sodium, potassium, lithium, magnesium, calcium, zinc, titanium, manganese, iron, cobalt, nickel, aluminum, and tin. Hydroxides of these metals can also be used.

Specific examples of mono- to trivalent metal salts include metal chlorides such as sodium chloride, potassium chloride, lithium chloride, magnesium chloride, calcium chloride, zinc chloride, titanium chloride, manganese chloride, iron chloride, cobalt chloride, nickel chloride, aluminum chloride, and tin chloride; nitric acid salts such as sodium nitrate, potassium nitrate, lithium nitrate, magnesium nitrate, calcium nitrate, zinc nitrate, titanium nitrate, manganese nitrate, iron nitrate, cobalt nitrate, nickel nitrate, aluminum nitrate, and tin nitrate; sulfuric acid salts such as sodium sulfate, potassium sulfate, lithium sulfate, magnesium sulfate, calcium sulfate, zinc sulfate, titanium sulfate, manganese sulfate, iron sulfate, cobalt sulfate, nickel sulfate, aluminum sulfate, and tin sulfate; and the like. Among these, preferred are calcium chloride, sodium chloride, aluminum sulfate, magnesium chloride, magnesium sulfate, zinc chloride, zinc sulfate, and sodium sulfate. Among these, more preferred are mono- or divalent metal salts, more preferred are divalent metal salts, still more preferred are magnesium salts, further still more preferred are inorganic magnesium salts, and particularly preferred is magnesium sulfate. These may be used alone or in combination.

The amount of the coagulant used is preferably 0.01 to 100 parts by weight, more preferably 0.1 to 50 parts by weight, still more preferably 1 to 30 parts by weight relative to 100 parts by weight of the monomer components used in polymerization. By adjusting the amount of the coagulant used within the ranges above, the acrylic rubber can be sufficiently coagulated, and the resulting acrylic rubber can have high water resistance.

Any method can be used to bring the polymer emulsion into contact with the coagulant without limitation. Examples thereof include a method of adding the polymer emulsion to an aqueous solution containing the coagulant while the aqueous solution containing the coagulant is being stirred, a method of adding an aqueous solution containing the coagulant to the polymer emulsion while the polymer emulsion is being stirred, and the like. Alternatively, without stirring, a method of simply adding the polymer emulsion to the aqueous solution containing the coagulant or a method of simply adding the aqueous solution containing the coagulant to the polymer emulsion may be used. Among these, preferred is a method of adding the polymer emulsion to the aqueous solution containing the coagulant while the aqueous solution containing the coagulant is being stirred. When the coagulation operation is performed using such a method, the particle size of hydrous crumbs yielded by the coagulation can be controlled within a relatively uniform range, thereby enhancing the washing efficiency of the hydrous crumbs yielded.

Although the concentration of the magnesium salt in the aqueous solution containing the coagulant is not particularly limited, the concentration is preferably 0.1 to 20% by weight, more preferably 0.5 to 10% by weight, still more preferably 1 to 5% by weight to more suitably control the particle size of the hydrous crumbs yielded by the coagulation.

Although the temperature (that is, coagulation temperature) of the aqueous solution containing the coagulant is not particularly limited, it is preferably 40° C. or more, more preferably 50 to 90° C. to more suitably control the particle size of the hydrous crumbs yielded by the coagulation.

Any stirring method can be used without limitation to stir the aqueous solution containing the coagulant. Examples thereof include a method of using a stirrer with a stirring blade. In this case, preferred is use of a method of placing the aqueous solution containing the coagulant into a stirring vessel, and adding the polymer emulsion to the aqueous solution containing the coagulant in the stirring vessel while the aqueous solution is being stirred with the stirring blade.

Furthermore, although the solids content of the polymer emulsion used in the coagulation is not particularly limited and the polymer emulsion prepared by performing emulsion polymerization and adding the antioxidant may be used as it is, the solids content is adjusted to the range of preferably 5 to 50% by weight, more preferably 10 to 45% by weight, particularly preferably 20 to 40% by weight to more suitably control the particle size of the hydrous crumbs to be yielded by the coagulation.

Subsequently, the hydrous crumbs yielded by the coagulation operation is preferably washed. Any washing method can be used without limitation. Examples thereof include a method of washing the hydrous crumbs yielded by the coagulation operation with water. Suitable examples thereof include a method of mixing the hydrous crumbs yielded by the coagulation operation with water. The temperature for the washing operation with water is preferably 5 to 60° C., more preferably 10 to 50° C. although not particularly limited. The mixing time is 1 to 60 minutes, more preferably 2 to 30 minutes.

Although the amount of water mixed with the hydrous crumbs is not particularly limited when the washing operation with water is performed, to enhance the efficiency of the washing operation with water, water is mixed in an amount of preferably 50 parts by weight or more, more preferably 50 to 15000 parts by weight, still more preferably 100 to 10000 parts by weight, particularly preferably 500 to 5000 parts by weight relative to 100 parts by weight of monomer components used in polymerization.

The time for the washing operation with water is preferably 1 to 120 minutes, more preferably 2 to 60 minutes, still more preferably 3 to 30 minutes, although not particularly limited.

The number of the washing operations with water is not particularly limited, and is preferably 1 to 10 times, more preferably 1 to 5 times, still more preferably 1 to 3 times. In the present invention, the number of the washing operations with water refers to the number of operations where an operation to add water to the hydrous crumbs, then mix these for a predetermined time, and separate the hydrous crumbs from water used in the washing operation with water is defined as one washing operation with water. Specifically, for example, two washing operations with water means that an operation to add water to the hydrous crumbs, then mix these for a predetermined time, and separate the hydrous crumbs from water used in the washing operation with water is performed, and subsequently another operation to add water to the hydrous crumbs, then mix these for a predetermined time, and separate the hydrous crumbs from water used in the washing operation with water is performed. When the washing operation with water is performed two or more times, the temperature and amount of the water used in the washing operation with water and the time for the washing operation with water may be the same or different.

In the present invention, after the washing operation with water is performed, acid washing may be further performed using an acid as a washing liquid. After the acid washing is performed, it is preferred that the washing operation with water be further performed. The same conditions as those in the washing operation with water can be used.

The hydrous crumbs washed may be dried. Any drying method can be used without limitation to dry the hydrous crumbs. Examples thereof include a method of drying the hydrous crumbs using a dryer such as a hot air dryer, a reduced pressure dryer, an expander dryer, a kneader dryer, or a screw extruder, and the like.

The temperature for drying the hydrous crumbs is preferably 80 to 250° C., more preferably 100 to 200° C., although not particularly limited.

Any method can be used without limitation to dehydrate the hydrous crumbs. Examples thereof include a method of draining water from the hydrous crumbs using a dehydrator such as a centrifuge, a squeezer, or a screw extruder. Preferred are methods using a squeezer or a screw extruder, and particularly preferred is a method using a screw extruder because these can further reduce the water content of the hydrous crumbs. Use of a screw extruder allows the dehydration and drying of the hydrous crumbs to be performed as a continuous step, which can enhance the productivity.

As the screw extruder, a twin screw extruder including a barrel unit composed of a plurality of barrel blocks and a pair of screws rotatably arranged inside the barrel unit can be suitably used.

The barrel unit can include, sequentially from the feed side of the hydrous crumbs, a feeding barrel section composed of one or two or more feeding barrel blocks, a dehydration barrel section composed of one or two or more dehydration barrel blocks, and a drying barrel section composed of one or two or more drying barrel blocks. A die for extruding the dehydrated and dried acrylic rubber into a sheet form is connected to the drying barrel section downstream thereof.

In the feeding barrel section, the hydrous crumbs are fed to the barrel unit. In the dehydration barrel section, a liquid containing the coagulant and the like (serum water) is separated from the hydrous crumbs. At least part of the dehydration barrel block (s) in the dehydration barrel section includes a slit from which water from the dehydration is drained. In the drying barrel section, the crumbs after dehydrated in the dehydration barrel section are dried.

The setting temperature of the dehydration barrel section is preferably 60 to 150° C., more preferably 70 to 140° C., still more preferably 80 to 130° C. The setting temperature of the drying barrel section is preferably 100 to 250° C., more preferably 110 to 200° C., still more preferably 120 to 180° C.

Although the screw length (L) of the pair of screws arranged inside the barrel unit in the screw extruder is not particularly limited, the screw length (L) is preferably 3000 to 15000 mm, more preferably 4000 to 10000 mm, still more preferably 4500 to 8000 mm. The screw diameter (D) of the screw, although not particularly limited, is preferably in the range of 50 to 250 mm, more preferably 100 to 200 mm, still more preferably 120 to 160 mm. Furthermore, the ratio (L/D) of the screw length (L) of the screw to the screw diameter (D) thereof, although not particularly limited, is preferably 10 to 100, more preferably 20 to 80, still more preferably 30 to 60. Adjusting the screw length (L) and the screw diameter (D) within the ranges above can result in efficient dehydration and drying while effectively suppressing a reduction in molecular weight of the acrylic rubber and burning thereof.

The screw extruder can be operated on any operating conditions when the hydrous crumbs are dehydrated and dried using the screw extruder, and examples thereof include the conditions described below.

Specifically, the rotational speed N [rpm] of the pair of screws arranged inside the barrel unit is preferably 10 to 1000 rpm. The rotational speed is more preferably 50 to 750 rpm, still more preferably 100 to 500 rpm, particularly preferably 120 to 300 rpm because the water content and the gel content in the acrylic rubber can be efficiently reduced.

The processing amount Q [kg/hr] of the acrylic rubber dried per unit time with the screw extruder is preferably 100 to 1500 kg/hr, more preferably 300 to 1200 kg/hr, still more preferably 400 to 1000 kg/hr, particularly preferably 500 to 800 kg/hr.

Furthermore, the ratio (Q/N) of the processing amount Q of the acrylic rubber dried per unit time to the rotational speed N of the screw is preferably 1 to 20, more preferably 2 to 10, still more preferably 3 to 8, particularly preferably 4 to 6, although not particularly limited. By adjusting "Q/N" within the ranges above, an acrylic rubber having a reduced water content can be produced with high productivity.

Although the rubber pressure (resin pressure or discharge pressure) in the die connected to the drying barrel section downstream thereof is not particularly limited, it is preferably 0.1 to 10 MPa, more preferably 0.5 to 5 MPa, still more preferably 1 to 3 MPa because high productivity can be attained while air involvement can be effectively suppressed.

Although the temperature of the hydrous crumbs fed to the screw extruder is not particularly limited, it is preferably 60° C. or more because it can increase dehydration and drying efficiency, and can further enhance the water resistance of an acrylic rubber to be obtained.

In the present invention, the acrylic rubber can be produced as described above.

In the present invention, the acrylic rubber may be obtained in the form of crumbs, or may be obtained in the form of a baled rubber, namely, an acrylic rubber bale (acrylic rubber formed into blocks having a predetermined shape).

<Rubber Composition>

The rubber composition according to the present invention comprises a rubber component containing the acrylic rubber according to the present invention, and a cross-linking agent.

Although the proportion of the acrylic rubber according to the present invention component in the rubber component may be appropriately selected according to the purpose of usage, it is preferably 30% by weight or more, more preferably 50% by weight or more, still more preferably 70% by weight or more, particularly preferably 100% by weight (that is, an embodiment where the rubber component contains substantially only an acrylic rubber component).

The rubber component may further contain any rubber other than the acrylic rubber according to the present invention without limitation. Examples thereof include acrylic rubber other than the acrylic rubber according to the present invention, natural rubber, polybutadiene rubber, polyisoprene rubber, styrene-butadiene rubber, acrylonitrile-butadiene rubber, silicon rubber, fluorocarbon rubber, olefin elastomers, styrene elastomers, vinyl chloride elastomers, polyester elastomers, polyamide elastomers, polyurethane elastomers, polysiloxane elastomers, and the like.

These rubbers other than the acrylic rubber according to the present invention can be used alone or in combination. Although the acrylic rubber according to the present invention and the rubber other than the acrylic rubber according to the present invention can have any form, these rubbers may have any of a bale form, a sheet form, a powdery form, and the like.

Any cross-linking agent can be used without limitation. Conventionally known cross-linking agents can be used, for example, polyvalent amine compounds, such as diamine compounds, and carbonates thereof; sulfur; sulfur donors; triazinethiol compounds; polyvalent epoxy compounds; organic carboxylate ammonium salts; organic peroxides; metal salts of dithiocarbamic acid; polyvalent carboxylic acids; quaternary onium salts; imidazole compounds; isocyanuric acid compounds; and the like. These cross-linking agents can be used alone or in combination. It is preferred that the cross-linking agent be appropriately selected according to the type of the cross-linkable group-containing monomer unit.

Among these, preferred cross-linking agents to be used are polyvalent amine compounds and carbonates thereof when the acrylic rubber according to the present invention contains a carboxyl group-containing monomer unit as the cross-linkable group-containing monomer unit.

Any polyvalent amine compounds and carbonates thereof can be used without limitation. Preferred are $C_4$ to $C_{30}$ polyvalent amine compounds and carbonates thereof. Examples of such polyvalent amine compounds and carbonates thereof include aliphatic polyvalent amine compounds and carbonates thereof, aromatic polyvalent amine compounds, and the like.

Examples of the aliphatic polyvalent amine compounds and carbonates thereof include, but should not be limited to, hexamethylenediamine, hexamethylenediamine carbamate, N, N'-dicinnamylidene-1,6-hexanediamine, and the like. Among these, preferred is hexamethylenediamine carbamate.

Examples of aromatic polyvalent amine compounds include, but should not be limited to, 4,4'-methylenedianiline, p-phenylenediamine, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene) dianiline, 2,2-bis[4-(4-aminophenoxy)phenyl]propane, 4,4'-diaminobenzanilide, 4,4'-bis(4-aminophenoxy) biphenyl, m-xylylenediamine, p-xylylenediamine, 1,3,5-benzenetriamine, and the like. Among these, preferred is 2,2'-bis[4-(4-aminophenoxy)phenyl]propane.

When the acrylic rubber according to the present invention contains a halogen atom-containing monomer unit as the cross-linkable group-containing monomer unit, preferred cross-linking agents to be used are sulfur, sulfur donors, triazinethiol compounds, polyvalent amine compounds, and carbonates of polyvalent amine compounds.

Examples of sulfur donors include dipentamethylenethiuram hexasulfide, triethylthiuram disulfide, and the like.

Examples of triazine compounds include 2,4,6-trimercapto-s-triazine, 2-anilino-4,6-dithiol-s-triazine, 2-dibutylamino-4,6-dithiol-s-triazine, 1-hexylamino-3,5-dimercaptotriazine, and the like. Among these, preferred is 2,4,6-trimercapto-s-triazine.

As the polyvalent amine compounds and carbonates of polyvalent amine compounds, those listed above can be used, for example.

The content of the cross-linking agent in the rubber composition according to the present invention is preferably 0.001 to 20 parts by weight, more preferably 0.1 to 10 parts by weight, still more preferably 0.1 to 5 parts by weight, particularly preferably 0.2 to 4 parts by weight relative to 100 parts by weight of the rubber component containing the acrylic rubber according to the present invention. Adjusting the content of the cross-linking agent within the ranges above can provide a cross-linked rubber having sufficient rubber elasticity and high mechanical strength.

Furthermore, when the acrylic rubber according to the present invention contains an epoxy group-containing monomer unit as the cross-linkable group-containing monomer unit, preferred cross-linking agents to be used are polyvalent amine compounds, polyvalent amine compounds, carbonates of polyvalent amine compounds; carboxylate ammonium salts such as ammonium benzoate and ammonium adipate; metal salts of dithiocarbamic acid such as zinc dimethyldithiocarbamate; polyvalent carboxylic acids such as tetradecanedioic acid; quaternary onium salts such as cetyltrimethylammonium bromide; imidazole compounds such as 2-methylimidazole; isocyanuric acid compounds such as ammonium isocyanurate; and the like. As the polyvalent amine compounds and carbonates of polyvalent amine compounds, those listed above can be used, for example. Among these, preferred are carboxylate ammonium salts and metal salts of dithiocarbamate, and more preferred is ammonium benzoate.

It is also preferred that the rubber composition according to the present invention further comprise a cross-linking accelerator. Any cross-linking accelerator can be used without limitation. When the acrylic rubber according to the present invention has a carboxyl group as the cross-linkable group and the cross-linking agent is a polyvalent amine compound or a carbonate thereof, guanidine compounds, diazabicycloalkene compounds, imidazole compounds, quaternary onium salts, tertiary phosphine compounds, aliphatic monovalent secondary amine compounds, aliphatic monovalent tertiary amine compounds, and the like can be used. Among these, preferred are guanidine compounds, diazabicycloalkene compounds, and aliphatic monovalent secondary amine compounds, and particularly preferred are guanidine compounds and diazabicycloalkene compounds. These basic cross-linking accelerators can be used alone or in combination.

Specific examples of guanidine compounds include 1,3-di-o-tolylguanidine, 1,3-diphenylguanidine, and the like. Specific examples of diazabicycloalkene compounds include 1,8-diazabicyclo[5.4.0]undec-7-ene, 1,5-diazabicyclo[4.3.0]non-5-ene, and the like. Specific examples of imidazole compounds include 2-methylimidazole, 2-phenylimidazole, and the like. Specific examples of quaternary onium salts include tetra-n-butylammonium bromide, octadecyltri-n-butylammonium bromide, and the like. Specific examples of tertiary phosphine compounds include triphenylphosphine, tri-p-tolylphosphine, and the like.

The aliphatic monovalent secondary amine compounds are compounds where two hydrogen atoms of ammonia are substituted by an aliphatic hydrocarbon group. The aliphatic hydrocarbon groups which substitute the hydrogen atoms are preferably $C_1$ to $C_{30}$ groups. Specific examples of the aliphatic monovalent secondary amine compounds include dimethylamine, diethylamine, dipropylamine, diallylamine, diisopropylamine, di-n-butylamine, di-t-butylamine, di-sec-butylamine, dihexylamine, diheptylamine, dioctylamine, dinonylamine, didecylamine, diundecylamine, didodecylamine, ditridecylamine, ditetradecylamine, dipentadecylamine, dicetylamine, di-2-ethylhexylamine, dioctadecylamine, and the like.

The aliphatic monovalent tertiary amine compounds are compounds where all the three hydrogen atoms of ammonia are substituted by an aliphatic hydrocarbon group. The aliphatic hydrocarbon groups which substitute the hydrogen atoms are preferably $C_1$ to $C_{30}$ groups. Specific examples of the aliphatic monovalent tertiary amine compounds include trimethylamine, triethylamine, tripropylamine, triallylamine, triisopropylamine, tri-n-butylamine, tri-t-butylamine, tri-sec-butylamine, trihexylamine, triheptylamine, trioctylamine, trinonylamine, tridecylamine, triundecylamine, tridodecylamine, and the like.

In the rubber composition according to the present invention, the content of the cross-linking accelerator is preferably 0.1 to 10 parts by weight, more preferably 0.5 to 7.5 parts by weight, particularly preferably 1 to 5 parts by weight relative to 100 parts by weight of the rubber component containing the acrylic rubber according to the present invention. Adjusting the content of the cross-linking accelerator within the ranges above can provide a cross-linked rubber having further enhanced tensile strength and compression set resistance.

The rubber composition according to the present invention may further contain a filler. Examples of the filler include, but should not be limited to, reinforcing fillers, non-reinforcing fillers, and the like. Among these, preferred are reinforcing fillers.

Examples of the reinforcing fillers include carbon blacks such as furnace black, acetylene black, thermal black, channel black, and graphite; silicas such as wet silica, dry silica, and colloidal silica; and the like. Examples of the non-reinforcing fillers include quartz powder, clay such as diatomite, zinc oxide, basic magnesium carbonate, active calcium carbonate, magnesium silicate, aluminum silicate, titanium dioxide, talc, aluminum sulfate, calcium sulfate, barium sulfate, and the like.

These fillers can be used alone or in combination. Although the content of the filler in the rubber composition according to the present invention is not particularly limited, the content is preferably 1 to 200 parts by weight, more preferably 10 to 150 parts by weight, still more preferably 20 to 100 parts by weight relative to 100 parts by weight of the rubber component containing the acrylic rubber according to the present invention.

The rubber composition according to the present invention may contain an antioxidant as needed. Specifically, in addition to the phenolic antioxidant optionally contained in the acrylic rubber, an additional antioxidant may be added. Examples of the antioxidant include, but should not be limited to, the above-mentioned phenolic antioxidants; phosphorous acid ester antioxidants such as tris(nonylphenyl)phosphite, diphenylisodecyl phosphite, and tetraphenyldipropylene glycol diphosphite; sulfur ester antioxidants such as dilauryl thiodipropionate; amine antioxidants such as phenyl-α-naphthylamine, phenyl-β-naphthylamine, p-(p-toluenesulfonylamide)-diphenylamine, 4,4'-bis(α,α-dimethylbenzyl) diphenylamine, N, N-diphenyl-p-phenylenediamine, N-isopropyl-N'-phenyl-p-phenylenediamine, and butylaldehyde-aniline condensates; imidazole antioxidants such as 2-mercaptobenzimidazole; quinoline antioxidants such as 6-ethoxy-2,2,4-trimethyl-1,2-dihydroquinoline; hydroquinone antioxidants such as 2,5-di-(t-amyl) hydroquinone; and the like.

These antioxidants can be used alone or in combination. Although the content of the antioxidant in the rubber composition according to the present invention is not particularly limited, the content is preferably 0.01 to 15 parts by weight, more preferably 0.05 to 10 parts by weight, still more preferably 0.1 to 5 parts by weight relative to 100 parts by weight of the rubber component containing the acrylic rubber according to the present invention.

Besides the ingredients described above, the rubber composition according to the present invention can contain compounding agents usually used in the rubber processing field. Examples of such compounding agents include light stabilizers; scorch retardants; plasticizers; processing aids; tackifiers; lubricants; greases; flame retardants; antifungal agents; antistatic agents; colorants; cross-linking retarders; and the like. These compounding agents can be compounded in any amount in the range not inhibiting the object and effect of the present invention, and can be appropriately compounded in amounts according to the purpose of compounding.

The rubber composition according to the present invention is prepared by compounding the cross-linking agent and a variety of compounding agents optionally used with the above-mentioned rubber component containing the acrylic rubber according to the present invention, mixing and kneading these ingredients with an open roll mill, a Banbury mixer, or a kneader, and further kneading the ingredients with a kneading roll.

Although the ingredients can be compounded in any order, preferred order is as follows. Ingredients which barely react or decompose by heat are sufficiently mixed, and then ingredients which readily react or decompose by heat, such as the cross-linking agent, are mixed in a short time at a temperature at which the reaction and the decomposition thereof are avoided.

<Cross-Linked Rubber>

The cross-linked rubber according to the present invention is prepared by cross-linking the above-mentioned rubber composition according to the present invention.

The cross-linked rubber according to the present invention can be produced as follows: The acrylic rubber composition according to the present invention is formed with a forming machine which can form the acrylic rubber composition into a desired shape, such as an extruder, an injection molding machine, a press, or a roll, and the formed product is cross-linked by heating into a cross-linked rubber having a fixed shape. In this case, cross-linking may be performed after the acrylic rubber composition is preliminarily formed, or cross-linking and forming may be performed at the same time. The forming temperature is usually 10 to 200° C., preferably 25 to 120° C. The cross-linking temperature is usually 130 to 220° C., preferably 150 to 190° C., and the cross-linking time is usually 2 minutes to 10 hours, preferably 3 minutes to 5 hours. The heating method is appropriately selected from methods used in cross-linking of rubber, such as press heating, steam heating, oven heating, and hot air heating.

The cross-linked rubber according to the present invention may be further heated to undergo secondary cross-linking depending on the shape and size of the cross-linked rubber. The secondary cross-linking is performed preferably for 1 to 48 hours although the time varies depending on the heating method, the cross-linking temperature, the shape of the product, and the like. The heating method and the heating temperature may be appropriately selected.

The cross-linked rubber according to the present invention thus obtained is suitably used as sealing materials such as O-rings, packings, diaphragms, oil seals, shaft seals, bearing sheaths, mechanical seals, wellhead seals, seals for electrical and electronic devices, and seals for air compressors; a variety of gaskets such as cylinder head gaskets attached to a connection between a cylinder block and a cylinder head, rocker cover gaskets attached to a connection between a rocker cover and a cylinder head, oil pan gaskets attached to a connection between an oil pan and a cylinder head or a transmission case, gaskets for a fuel cell separator attached between a pair of housings which sandwich a unit cell including a positive electrode, an electrolyte plate, and a negative electrode, and a gasket for top covers for hard disk drives; buffer materials; vibration insulators; coating materials for electric wires; industrial belts; tubes and hoses; sheets; and the like.

The cross-linked rubber according to the present invention is also suitably used as extrusion molded products and cross-linked products used in automobile applications, for example, fuel oil hoses for fuel tanks such as fuel hoses, filler neck hoses, vent hoses, vapor hoses, and oil hoses, air hoses such as turbo air hoses and transmission control hoses, and a variety of hoses such as radiator hoses, heater hoses, brake hoses, and air conditioner hoses.

EXAMPLES

The present invention will now be more specifically described by way of Examples and Comparative Examples. In Examples, the term "parts" is weight-based unless otherwise specified.

A variety of physical properties were evaluated according to the following methods.

[Monomer Composition of Acrylic Rubber]

The monomer composition of the acrylic rubber was calculated from the amounts of the monomers used in the polymerization reaction and the polymerization conversion ratio. Specifically, in all of Examples and Comparative Examples, unreacted monomers were not observed in the emulsion polymerization reaction, and the polymerization conversion ratio was approximately 100%. From this finding, the amounts of the monomers used in the polymerization reaction were regarded as the contents of the monomer units in each acrylic rubber.

[Mooney Viscosity (ML1+4, 100° C.)]

Mooney viscosity (polymer Mooney) of acrylic rubbers was measured according to JIS K6300:2013.

[Measurement of Roll Processability of Acrylic Rubber Composition]

The adhesion to a roll when acrylic rubber compositions were prepared with the roll was evaluated according to the following criteria. In the criteria, a higher rank indicates higher processability.

⊚: No adhesion to the roll surface is observed, and operationability is good.

○: Slight adhesion to the roll surface is observed, but cutting and tight milling of the composition can be performed.

Δ: Remarkable adhesion to the roll surface is observed, and cutting and tight milling thereof cannot be performed.

x: Remarkable adhesion to the roll surface is observed, the rubber adheres to both sides of rolls, and kneading cannot be performed.

The cutting operation is a kneading operation which repeats an operation to peel part (about a half) of the rubber composition adhering to the roll from the roll, overlay the peeled rubber composition portion on the rubber composition portion adhering to the roll, and pass the overlaid rubber composition through the rolls.

The tight milling operation is a kneading operation following after the cutting operation, which repeats an operation to again pass the rubber composition through the rolls with the smallest gap between the rolls such that in the thickness direction of the rubber composition in a sheet form, the long sides of the rubber composition intersect vertically to the axial direction of the rolls.

[Tensile Strength and Elongation at Break]

Each of acrylic rubber compositions was placed into a mold having a length of 15 cm, a width of 15 cm, and a depth of 0.2 cm. The acrylic rubber composition was then pressed at 170° C. for 20 minutes under a pressure of 10 MPa to be primarily cross-linked. The primary cross-linked product was then further heated in a geer oven at 170° C. for 4 hours to be secondarily cross-linked. A sheet-shaped cross-linked rubber was thereby prepared. The resulting cross-linked rubber was punched out with a #3 dumbbell into a test piece. In the next step, this test piece was used to measure the tensile strength and the elongation at break according to JIS K6251:2017.

[Compression Set Test]

Each of acrylic rubber compositions was molded and cross-linked by pressing at 170° C. for 20 minutes to prepare a cylindrical test piece having a diameter of 29 mm and a thickness of 12.5 mm. Further, the test piece was secondarily cross-linked by heating at 150° C. for 4 hours. According to JIS K6262:2006, the secondarily cross-linked test piece prepared above was left to stand for 70 hours under a 150° C. environment while it was 25% compressed. Thereafter, the compression was released to measure the compression set (%). A smaller value of the compression set (%) indicates higher compression set resistance.

Example 1

(Production of Acrylic Rubber (A-1))

46.294 Parts of deionized water, 46.8 parts of ethyl acrylate as a monomer component, 46.8 parts of n-butyl acrylate, 5 parts of acrylamide, 1.4 parts of mono-n-butyl fumarate, and 1.8 parts of sodium tridecyloxyhexa(oxyethylene)phosphate ester (anionic emulsifier) as an emulsifier were placed into a mixing vessel provided with a homomixer, followed by stirring to prepare a monomer emulsion.

In the next step, 170.853 parts of pure water and 2.962 parts of the monomer emulsion prepared above were placed into a polymerization reaction vessel provided with a thermometer and a stirrer, and were cooled to 12° C. under a nitrogen stream. Subsequently, 145.132 parts of the monomer emulsion prepared above, 0.00033 parts of ferrous sulfate (reductant), 0.264 parts of sodium ascorbate (reductant), and 7.72 parts (0.22 parts in terms of potassium persulfate) of 2.85% by weight potassium persulfate aqueous solution (polymerization initiator) were continuously added dropwise to a polymerization reaction vessel over 3 hours while the temperature was kept at 12° C. Subsequently, the reaction was continued for one hour in the state where the inner temperature of the polymerization reaction vessel was kept at 23° C. After it was checked that the polymerization conversion ratio reached approximately 100%, the polymerization reaction was stopped by adding hydroquinone as a polymerization terminator to prepare a polymer emulsion.

Subsequently, separately from above, 50 parts of an aqueous solution of 12% by weight sodium tridecyloxyhexa (oxyethylene)phosphate ester (anionic emulsifier), and 50 parts of octyl 3-(3,5-di-tert-butyl-4-hydroxyphenyl)propionate (trade name "Irganox 1135", available from BASF SE, sterically hindered phenolic antioxidant, molecular weight: 390, melting point: 10° C.) were mixed and stirred at a temperature of 25° C. to prepare an antioxidant dispersion (concentration of sodium tridecyloxyhexa(oxyethylene)phosphate ester as an emulsifier: 6% by weight, concentration of the phenolic antioxidant: 50% by weight).

In the next step, 0.36 parts (0.5 parts of the phenolic antioxidant relative to 100 parts of the rubber component in the polymer emulsion) of the antioxidant dispersion prepared above was added to 100 parts of the polymer emulsion (temperature: 25° C.), followed by stirring.

Subsequently, 60 parts of 30% by weight magnesium sulfate aqueous solution adjusted to 85° C. was placed into a coagulation vessel provided with a thermometer and a stirrer, and was stirred with a stirring blade in the state where the system was heated at 85° C. Under stirring, 100 parts of the polymer emulsion prepared above and containing the antioxidant dispersion was continuously added to the magnesium sulfate aqueous solution to coagulate the polymer, which was filtered to obtain hydrous crumbs.

In the next step, hydrous crumbs is washed by adding 388 parts of industrial water to 100 parts of solids content of the hydrous crumbs obtained above, and was stirred at room temperature for 5 minutes in the coagulation vessel, followed by draining the water from the coagulation vessel. The hydrous crumbs after being washed with water was then dried with a hot air dryer at 110° C. for one hour to yield a solid acrylic rubber (A-1) with a recovery ratio of 100%. The Mooney viscosity of the resulting acrylic rubber (A-1) was measured by the method described above. The result is shown in Table 1.

(Preparation of Acrylic Rubber Composition)

60 Parts of carbon black (trade name "SEAST SO", available from Tokai Carbon Co., Ltd.), 1 part of stearic acid, 1 part of ester wax (trade name "GLECK 8205", available from DIC Corporation), and 2 parts of 4,4'-bis(α,α-dimethylbenzyl)diphenylamine (trade name "NOCRAC CD", available from Ouchi Shinko Chemical Industrial Co., Ltd.) were added to 100 parts of the acrylic rubber (A-1) prepared above, and were mixed at 50° C. for 5 minutes using a Banbury mixer. The resulting mixture was transferred to a roll at 50° C., and 0.5 parts of hexamethylenediamine carbamate (trade name "Diak #1", available from Dupont Dow Elastomers LLC) and 2 parts of 1,3-di-o-tolylguanidine (trade name "NOCCELERDT", available from Ouchi Shinko Chemical Industrial Co., Ltd.) were compounded relative to 100 parts of the acrylic rubber (A-1), followed by kneading with the roll to prepare an acrylic rubber composition. In the kneading with the roll, adhesion to the roll was evaluated according to the criteria described above. The resulting acrylic rubber composition was then subjected to measurement of the tensile strength and the elongation at break and the compression set test. The results are shown in Table 1.

Example 2

An acrylic rubber (A-2) was obtained in the same manner as in Example 1 except that the amounts of the monomer components were changed to 48.8 parts of ethyl acrylate, 48.8 parts of n-butyl acrylate, 1 part of acrylamide, and 1.4 parts of mono-n-butyl fumarate, respectively. An acrylic rubber composition was prepared in the same manner as in Example 1 except that the resulting acrylic rubber (A-2) was used. These were evaluated in the same manner as in Example 1. The results are shown in Table 1.

Example 3

An acrylic rubber (A-3) was obtained in the same manner as in Example 1 except that the amounts of the monomer components were changed to 41.8 parts of ethyl acrylate, 41.8 parts of n-butyl acrylate, 15 parts of acrylamide, and 1.4 parts of mono-n-butyl fumarate, respectively. An acrylic rubber composition was prepared in the same manner as in Example 1 except that the resulting acrylic rubber (A-3) was used. These were evaluated in the same manner as in Example 1. The results are shown in Table 1.

Example 4

An acrylic rubber (A-4) was obtained in the same manner as in Example 1 except that ethyl acrylate as a monomer component was not used, and the amounts of the monomer components other than that were changed to 93.6 parts of n-butyl acrylate, 5 parts of acrylamide, and 1.4 parts of mono-n-butyl fumarate, respectively. An acrylic rubber composition was prepared in the same manner as in Example 1 except that the resulting acrylic rubber (A-4) was used. These were evaluated in the same manner as in Example 1. The results are shown in Table 1.

Example 5

(Production of Acrylic Rubber (A-5))

An acrylic rubber (A-5) was obtained in the same manner as in Example 1 except that as a monomer component, 1.4 parts of monocyclohexyl fumarate was used instead of 1.4 parts of mono-n-butyl fumarate. An acrylic rubber composition was prepared in the same manner as in Example 1 except that the resulting acrylic rubber (A-5) was used. These were evaluated in the same manner as in Example 1. The results are shown in Table 1.

Example 6

(Production of Acrylic Rubber (A-6))

An acrylic rubber (A-6) was obtained in the same manner as in Example 1 except that as a monomer component, 1.4 parts of glycidyl methacrylate was used instead of 1.4 parts of mono-n-butyl fumarate. The resulting acrylic rubber (A-6) was evaluated in the same manner as in Example 1. The results are shown in Table 1.

(Preparation of Acrylic Rubber Composition)

An acrylic rubber composition was prepared in the same manner as in Example 1 except that the acrylic rubber (A-6) obtained above was used, and 1.5 parts of ammonium benzoate (trade name "VULNOC AB-S", available from Ouchi Shinko Chemical Industrial Co., Ltd.) was used instead of hexamethylenediamine carbamate and 1,3-di-o-tolylguanidine, and was evaluated likewise. The results are shown in Table 1.

Example 7

(Production of Acrylic Rubber (A-7))

An acrylic rubber (A-7) was obtained in the same manner as in Example 1 except that as a monomer component, vinyl monochloroacetate was used instead of mono-n-butyl fumarate and the amounts of the monomer components were changed to 46.2 parts of ethyl acrylate, 46.2 parts of n-butyl acrylate, 5 parts of acrylamide, and 2.6 parts of vinyl monochloroacetate, respectively. The resulting acrylic rubber (A-7) was evaluated in the same manner as in Example 1. The results are shown in Table 1.

(Preparation of Acrylic Rubber Composition)

An acrylic rubber composition was in the same manner as in Example 1 except that the acrylic rubber (A-7) obtained above was used, and 3.0 parts of sodium soap of semi-cured beef tallow fatty acid (trade name "NS Soap", available from Kao Corporation), 0.5 parts of stearic acid (trade name "NONSOUL SK-1", NOF CORPORATION), and 0.3 parts of sulfur (trade name "SULFAX PMC", available from Tsurumi Chemical Industry Co., Ltd.) were used instead of hexamethylenediamine carbamate and 1,3-di-o-tolylguanidine, and was evaluated likewise. The results are shown in Table 1.

Comparative Example 1

An acrylic rubber (A-8) was obtained in the same manner as in Example 1 except that as a monomer component, acrylamide was not used and the amounts of the monomer components other than that were changed to 49.8 parts of ethyl acrylate, 49.8 parts of n-butyl acrylate, and 1.4 parts of mono-n-butyl fumarate, respectively. An acrylic rubber composition was prepared in the same manner as in Example 1 except that the resulting acrylic rubber (A-8) was used. These were evaluated in the same manner as in Example 1. The results are shown in Table 1.

Comparative Example 2

Emulsion polymerization was performed in the same manner as in Example 1 except that the amounts of the monomer components were changed to 38.8 parts of ethyl acrylate, 38.8 parts of n-butyl acrylate, 20 parts of acrylamide, and 1.4 parts of mono-n-butyl fumarate, respectively. The resulting polymer was water-soluble, and thus could not be recovered by the coagulation operation.

Comparative Example 3

An acrylic rubber (A-10) was obtained in the same manner as in Example 1 except that as the monomer components, ethyl acrylate and acrylamide were not used and the amount of n-butyl acrylate used was changed to 98.6 parts. An acrylic rubber composition was prepared in the same manner as in Example 1 except that the resulting acrylic rubber (A- 10) was used. These were evaluated in the same manner as in Example 1. The results are shown in Table 1.

TABLE 1

| | Example 1 | Example 2 | Example 3 | Example 4 | Example 5 | Example 6 | Example 7 | Comp. Ex. 1 | Comp. Ex. 2 | Comp. Ex. 3 |
|---|---|---|---|---|---|---|---|---|---|---|
| Type of acrylic rubber | (A-1) | A-2) | (A-3) | (A-4) | (A-5) | (A-6) | (A-7) | (A-8) | (A-9) | (A-10) |
| Reactive group | Carboxyl group | Carboxyl group | Carboxyl group | Carboxyl group | Carboxyl group | Epoxy group | Active chlorine group | Carboxyl group | Carboxyl group | Carboxyl group |
| Monomer compositon of acrylic rumbber (wt %) | | | | | | | | | | |
| Unit of ethyl acrylate | 46.8 | 48.8 | 41.8 | — | 46.8 | 46.8 | 46.2 | 48.8 | 38.8 | — |
| Unit of n-butyl acrylate | 46.8 | 48.8 | 41.8 | 93.6 | 46.8 | 46.8 | 46.2 | 49.8 | 39.8 | 98.6 |
| Unit of acrylamide | 5 | 1 | 15 | 5 | 5 | 5 | 5 | — | 20 | — |
| Unit of mono-n-butyl fumarate | 1.4 | 1.4 | 1.4 | 1.4 | — | — | — | 1.4 | 1.4 | 1.4 |

TABLE 1-continued

| | Example 1 | Example 2 | Example 3 | Example 4 | Example 5 | Example 6 | Example 7 | Comp. Ex. 1 | Comp. Ex. 2 | Comp. Ex. 3 |
|---|---|---|---|---|---|---|---|---|---|---|
| Unit of monocyclohexyl fumarate | — | — | — | — | 1.4 | — | — | — | — | — |
| Unit of glicidyl methacrylate | — | — | — | — | — | 1.4 | — | — | — | — |
| Unit of vinyl monochloroacetate | — | — | — | — | — | — | 2.6 | — | — | — |
| Results of evaluations<br>Evaluation of acrylic rubber | | | | | | | | | | |
| Polymer Mooney viscosity (ML1 + 4, 100° C.) | 34 | 33 | 36 | 25 | 34 | 34 | 34 | 33 | Not measurable | 24 |
| Evaluation of acrylic rubber composition | | | | | | | | | | |
| Roll processability | ◎ | ◎ | ◎ | ○ | ◎ | ◎ | ◎ | Δ | Not measurable | X |
| Evaluations of cross-linked rubber | | | | | | | | | | |
| Elongation at break (%) | 250 | 200 | 230 | 200 | 260 | 180 | 200 | 170 | Not measurable | 130 |
| Tensile strength (MPa) | 13 | 11.5 | 12.5 | 10.5 | 12.5 | 14.5 | 10.3 | 10.2 | | 8.3 |
| Compression set (%) | 14 | 14 | 16 | 16 | 16 | 35 | 25 | 14 | | 16 |

Table 1 shows that in the acrylic rubbers containing at least one cross-linkable group-containing monomer unit selected from the group consisting of carboxyl group-containing monomer units, halogen atom-containing monomer units, and epoxy group-containing monomer units and an (meth)acrylamide monomer unit, the amount of the (meth) acrylamide monomer unit being 0.2 to 17.5% by weight of the total monomer units, the adhesion to the roll was suppressed and high processability was demonstrated. Furthermore, the cross-linked rubbers obtained therefrom had high elongation at break and high tensile strength (Examples 1 to 8).

In contrast, in the case where the acrylic rubbers contained no acrylamide monomer, they adhered to the roll and had poor processability. The cross-linked rubbers obtained therefrom had low elongation at break and low tensile strength (Comparative Examples 1 and 3).

In the case where the amount of the acrylamide monomer unit was 20% by weight, a water-soluble polymer was obtained, and thus could not be recovered by the coagulation operation (Comparative Example 2).

The invention claimed is:

1. An acrylic rubber comprising:

at least one cross-linkable group-containing monomer unit selected from the group consisting of carboxyl group-containing monomer units, halogen atom-containing monomer units, and epoxy group-containing monomer-units; and units, an (meth)acrylamide monomer unit, and an (meth)acrylic acid ester monomer unit, wherein an ethyl acrylate unit and a n-butyl acrylate unit being contained as the (meth)acrylic acid ester monomer unit, and wherein the amount of the (meth)acrylamide monomer unit is 0.2 to 17.5% by weight of the total monomer units.

2. The acrylic rubber according to claim 1, wherein the amount of the (meth)acrylamide monomer unit is 1 to 15% by weight of the total monomer units.

3. The acrylic rubber according to claim 1, wherein the cross-linkable group-containing monomer unit is a carboxyl group-containing monomer unit.

4. A rubber composition comprising a rubber component including the acrylic rubber according to claim 1, and a cross-linking agent.

5. A cross-linked rubber obtained by cross-linking the rubber composition according to claim 4.

* * * * *